(12) United States Patent
Kim et al.

(10) Patent No.: US 9,730,185 B2
(45) Date of Patent: Aug. 8, 2017

(54) METHOD BY WHICH TERMINALS IN WIRELESS COMMUNICATION SYSTEMS RECEIVE DOWNLINK CONTROL CHANNELS AND APPARATUS FOR SAME

(71) Applicant: LG ELECTRONICS INC., Seoul (KR)

(72) Inventors: Myoungseob Kim, Anyang-si (KR); Inkwon Seo, Anyang-si (KR); Seungmin Lee, Anyang-si (KR); Hakseong Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 266 days.

(21) Appl. No.: 14/372,121

(22) PCT Filed: Jan. 4, 2013

(86) PCT No.: PCT/KR2013/000050
§ 371 (c)(1),
(2) Date: Jul. 14, 2014

(87) PCT Pub. No.: WO2013/125784
PCT Pub. Date: Aug. 29, 2013

(65) Prior Publication Data
US 2015/0055485 A1 Feb. 26, 2015

Related U.S. Application Data

(60) Provisional application No. 61/602,565, filed on Feb. 23, 2012.

(51) Int. Cl.
*H04W 72/00* (2009.01)
*H04W 48/12* (2009.01)
(Continued)

(52) U.S. Cl.
CPC ......... *H04W 72/005* (2013.01); *H04L 1/0061* (2013.01); *H04W 48/12* (2013.01);
(Continued)

(58) Field of Classification Search
None
See application file for complete search history.

(56) References Cited

U.S. PATENT DOCUMENTS

2009/0262854 A1 10/2009 Lee et al.
2011/0158351 A1 6/2011 Gorokhov et al.
(Continued)

FOREIGN PATENT DOCUMENTS

KR 10-2009-0110772 A 10/2009
WO WO 2010/120088 * 10/2010 ............. H04W 4/00
(Continued)

*Primary Examiner* — Shaq Taha
*Assistant Examiner* — Ronald H Davis
(74) *Attorney, Agent, or Firm* — Birch, Stewart, Kolasch & Birch, LLP

(57) ABSTRACT

The present invention relates to a method by which terminals in a wireless communication system receive control channels. More particularly, the method includes the steps of: receiving control information that includes the transmission mode for the control channel and information about the number of antenna ports through a broadcast channel from a base station; and receiving the control channel on the basis of the control information.

12 Claims, 15 Drawing Sheets

(51) Int. Cl.
  *H04L 1/00* (2006.01)
  *H04W 72/04* (2009.01)
  *H04W 48/16* (2009.01)
  *H04L 5/00* (2006.01)

(52) U.S. Cl.
  CPC ......... *H04W 72/042* (2013.01); *H04L 5/0048* (2013.01); *H04L 5/0055* (2013.01); *H04W 48/16* (2013.01)

(56) References Cited

U.S. PATENT DOCUMENTS

| | | | |
|---|---|---|---|
| 2011/0268050 A1 | 11/2011 | Farajidana et al. | |
| 2012/0008577 A1 | 1/2012 | Han et al. | |
| 2012/0039256 A1* | 2/2012 | Kwon | H04W 48/12 370/328 |
| 2012/0046033 A1* | 2/2012 | Ko | H04B 7/024 455/435.1 |
| 2012/0063351 A1* | 3/2012 | Kim | H04L 5/001 370/252 |
| 2012/0122472 A1* | 5/2012 | Krishnamurthy | H04L 5/0053 455/456.1 |

FOREIGN PATENT DOCUMENTS

| | | | | |
|---|---|---|---|---|
| WO | WO 2010/123295 | * | 10/2010 | ............. H04W 4/00 |
| WO | WO 2010/131925 | * | 11/2010 | ............ H04W 74/04 |

\* cited by examiner

FIG. 2
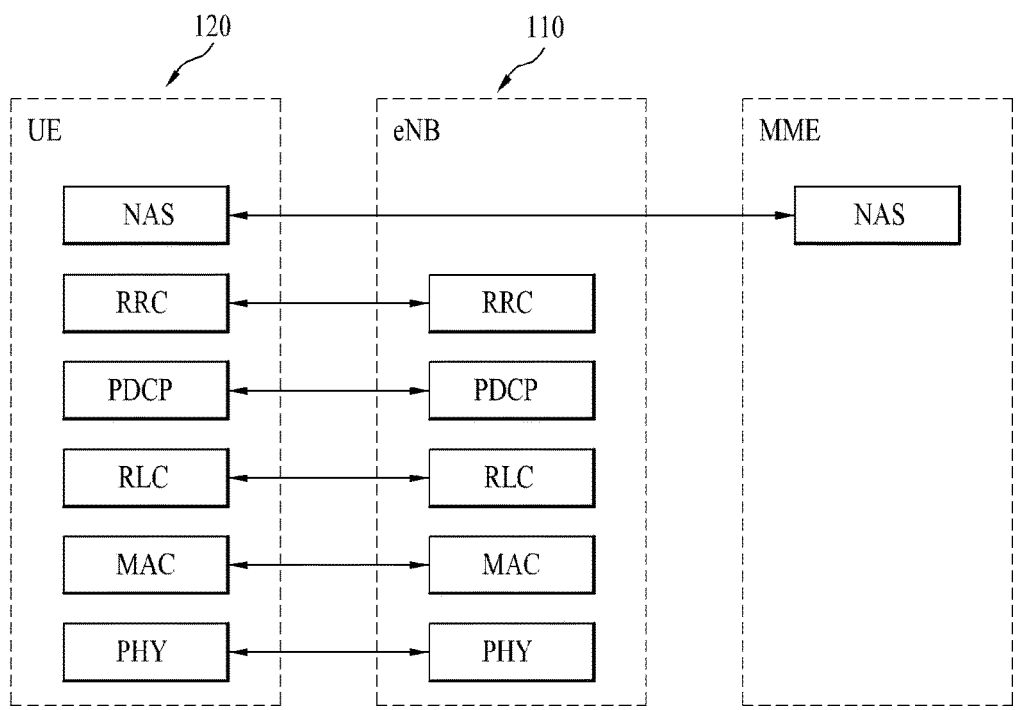
(a) Control-Plane Protocol Stack
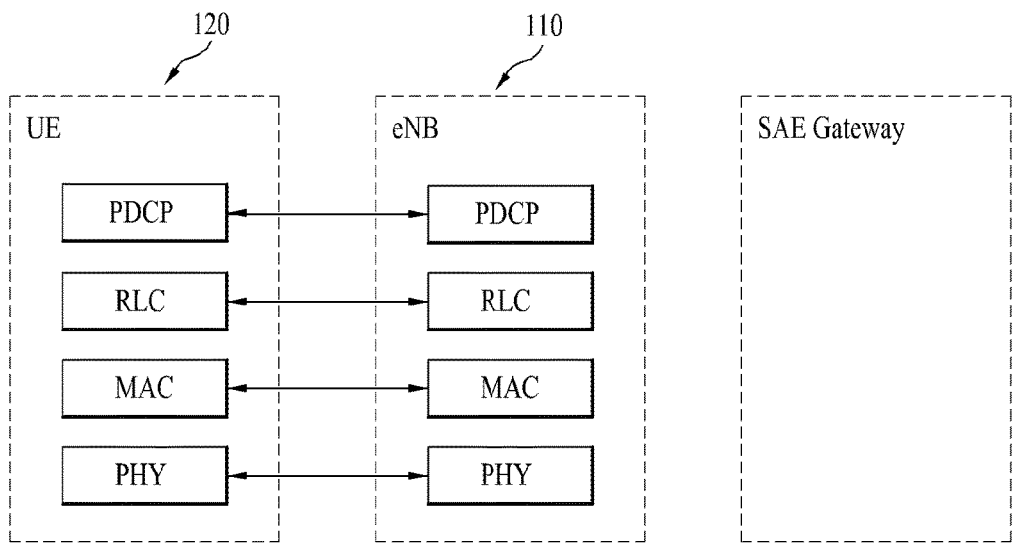
(b) User-Plane Protocol Stack

FIG. 6
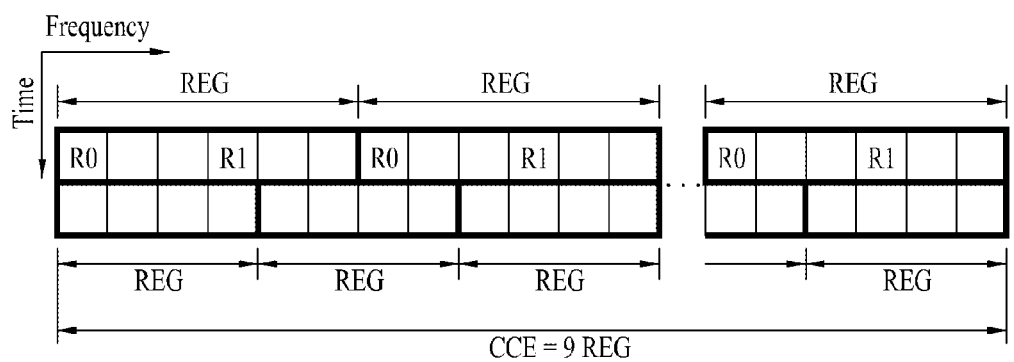
(a) 1TX or 2TX
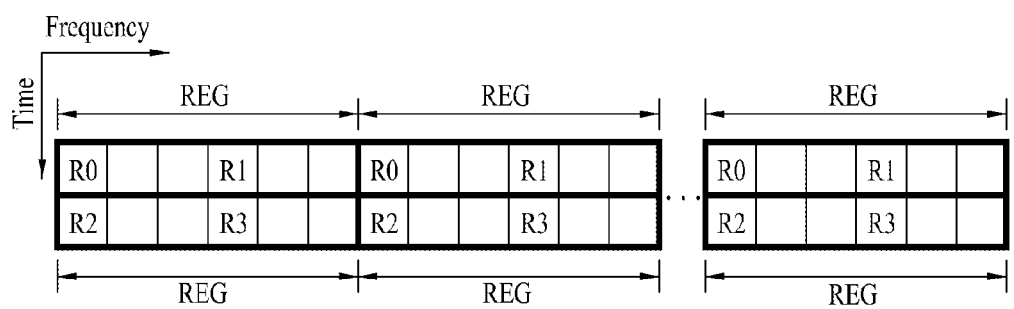
(b) 4 TX

FIG. 11

| dl-Bandwidth | phich-Bandwidth | SFN | Spare |

All 0's are mapped for spare bits : same operation as legacy PBCH => 0 0 0 0 0 0 0 0 0

( a ) MIB

| dl-Bandwidth | phich-Bandwidth | SFN | Tx mode (m bit) | Spare |

All 1's are mapped for Tx mode field : blind decoding for E-PDCCH => 1 ... 1

( b ) MIB including transmission mode field

| dl-Bandwidth | phich-Bandwidth | SFN | Tx mode (m bit) | # AP (n bit) | Spare |

( c ) MIB including transmission mode field and the number of antenna port field

| dl-Bandwidth | phich-Bandwidth | SFN | Tx mode (m bit) | AP status (k bit) | Spare |

1 0 1 0 ···
Antenna port index   p p+1 p+2 p+3 ···
Antenna port status  on off on off ( d ) MIB including transmission mode field and antenna port status field

METHOD BY WHICH TERMINALS IN WIRELESS COMMUNICATION SYSTEMS RECEIVE DOWNLINK CONTROL CHANNELS AND APPARATUS FOR SAME

This application is the National Phase of PCT International Application No. PCT/KR2013/000050, filed on Jan. 4, 2013, which claims priority under 35 U.S.C. 119(e) to U.S. Provisional Application No. 61/602,565, filed on Feb. 23, 2012, all of which are hereby expressly incorporated by reference into the present application.

TECHNICAL FIELD

The present invention relates to a wireless communication system, and more particularly, to a method for a user equipment to receive a control channel in a wireless communication system and an apparatus therefor.

BACKGROUND ART

3GPP LTE (3$^{rd}$ generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3$^{rd}$ generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

Accordingly, the present invention intends to propose a method for a user equipment to receive a downlink control channel in a wireless communication system and an apparatus therefor in the following description based on the discussion mentioned earlier in the foregoing description.

Technical Solution

To achieve these and other advantages and in accordance with the purpose of the present invention, as embodied and broadly described, according to one embodiment, a method of receiving a control channel, which is received by a user equipment in a wireless communication system includes the steps of receiving control information including information on a transmission mode for the control channel and the number of antenna port from an eNode B via a broadcast channel and receiving the control channel based on the control information.

In this case, the control information corresponds to an MIB (master information block) and the information on the transmission mode and the number of antenna port is included in a spare bit of the MIB. And, if the transmission mode of the broadcast channel and the transmission mode of the control channel are identical to each other, a remaining field of the MIB can be set to 0.

Or, the broadcast channel is masked by a CRC (cyclic redundancy check) indicating a specific value and the information on the transmission mode and the number of antenna port is represented by a specific value indicated by a CRC value masked on the broadcast channel.

Moreover, the broadcast channel can be received in a plurality of frames. In this case, the broadcast channel received via each of a plurality of the frames is masked by a CRC (cyclic redundancy check) indicating a specific value and the information on the transmission mode and the number of antenna port is represented by a combination of specific values indicated by a CRC value masked on the broadcast channel, which is received via each of a plurality of the frames.

Preferably, the transmission mode corresponds to one selected from the group consisting of a single antenna transmission scheme, an SFBC-based transmit diversity scheme and a precoder cycling-based RE level random beamforming scheme. And, the number of antenna port corresponds to one selected from the group consisting of 1, 2 and 4.

More preferably, the broadcast channel is received based on a cell-specific reference signal and the control channel is received based on a UE-specific reference signal.

To further achieve these and other advantages and in accordance with the purpose of the present invention, according to a different embodiment, a user equipment in a wireless communication system includes a wireless communication module configured to receive a signal from an eNode B and a processor configured to process the signal. The processor is configured to receive control information including information on a transmission mode for a control channel and the number of antenna port from the eNode B via a broadcast channel and control the user equipment to receive the control channel based on the control information.

It is to be understood that both the foregoing general description and the following detailed description are exemplary and explanatory and are intended to provide further explanation of the invention as claimed.

Advantageous Effects

According to embodiment of the present invention, a user equipment can efficiently receive a downlink control channel in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 2 is a diagram for structures of control and user planes of radio interface protocol between a 3GPP radio access network standard-based user equipment and E-UTRAN;

FIG. 6 is a diagram for a resource unit used for configuring a downlink control channel in LTE system;

FIG. 11 is a diagram for an example of adding a parameter for E-PDCCH to MIB according to first embodiment of the present invention;

BEST MODE

Mode for Invention

Figure 1:
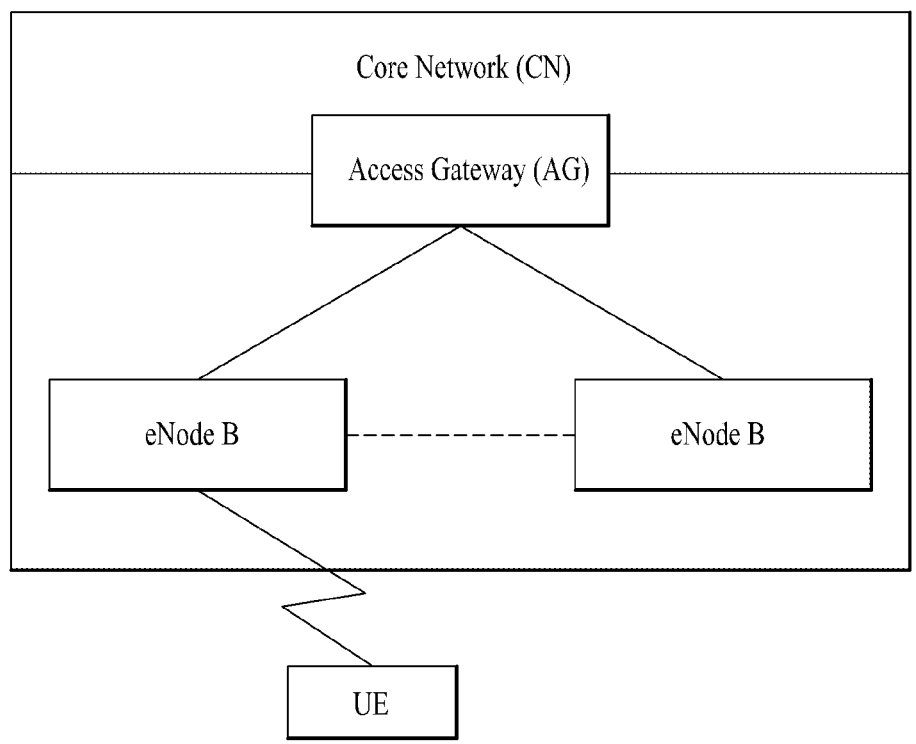
FIG. 1 is a schematic diagram of E-UMTS network structure as one example of a wireless communication system.

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a $1^{st}$ layer, provides higher layers with an information transfer service using a physical channel. The physical layer is connected to a medium access control layer situated above via a transport channel (trans antenna port channel). Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a $2^{nd}$ layer provides a service to a radio link control (hereinafter abbreviated RLC) layer, which is a higher layer, on a logical channel. The RLC layer of the $2^{nd}$ layer supports a reliable data transmission. The function of the RLC layer may be implemented by a function block within the MAC. PDCP (packet data convergence protocol) layer of the $2^{nd}$ layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a $3^{rd}$ layer is defined on a control plane only. The RRC layer is responsible for control of logical channels, transport channels and physical channels in association with a configuration, a re-configuration and a release of radio bearers (hereinafter abbreviated RBs). The RB indicates a service provided by the $2^{nd}$ layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
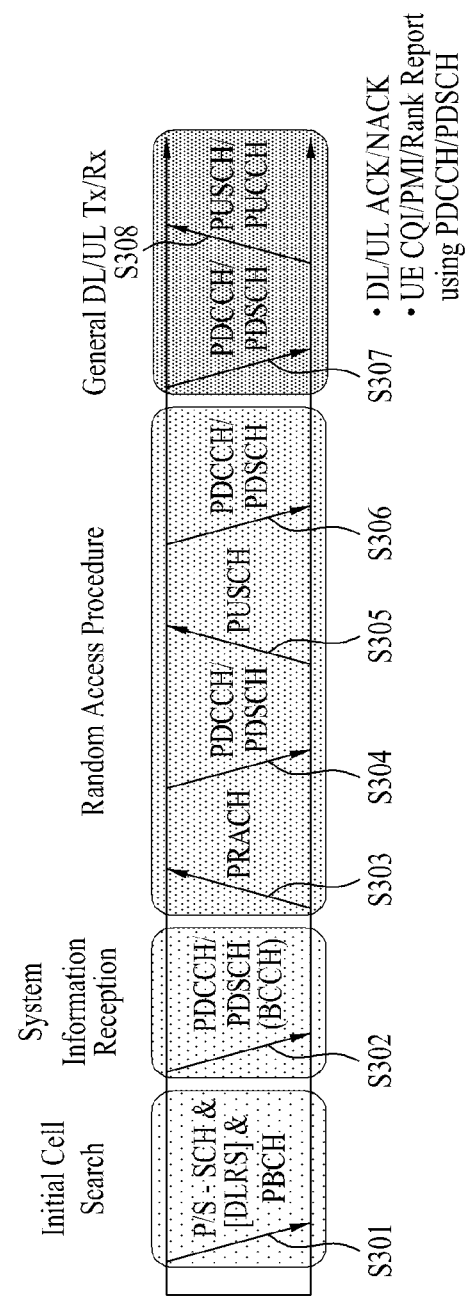
FIG. 3 is a diagram for explaining physical channels used for 3GPP system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

In the following description, MIMO system is explained. The MIMO (multiple-input multiple-output) is a method using a plurality of transmitting antennas and a plurality of receiving antennas. The efficiency in transmitting and receiving data may be enhanced by the MIMO. In particular, by using a plurality of the antennas at a transmitting end or a receiving end in a radio communication system, it may be able to increase a capacity and enhance performance. In the following description, the MIMO may be called a 'multi antenna'.

In the multiple antenna technology, it may not depend on a single antenna path to receive a whole message. Data is completed in a manner of combining data fragments received from many antennas in one place in the multiple antenna technology instead. When the multiple antenna technology is used, a data transmission speed may be enhanced in a cell area having a specific size or a system coverage may be enlarged while a specific data transmission speed is secured. And, this technology is widely used in a mobile communication terminal, a relay station, and the like. According to the multiple antenna technology, a throughput limitation of a single antenna used by a conventional technology in a mobile communication can be overcome.

Figure 4:
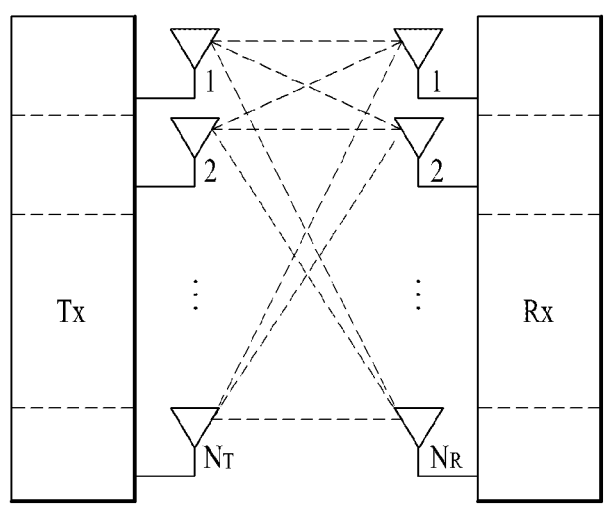
FIG. 4 is a diagram for a configuration of a multiple antenna communication system.

A block diagram of a general multi-antenna communication system is depicted in FIG. 4. $N_T$ number of transmitting antenna is installed in a transmitting end and $N_R$ number of receiving antenna is installed in a receiving end. As described in the above, in case that both the transmitting end and the receiving end use plural number of antennas, a theoretical channel transmission capacity is increased compared to a case that the plural number of antennas are only used for either the transmitting end or the receiving end. The increase of the channel transmission capacity is proportional to the number of antenna. Thus, a transfer rate is enhanced and frequency efficiency is enhanced. If a maximum transfer rate is represented as $R_o$ in case of using a single antenna, the transfer rate using multiple antennas can be theoretically increased as much as the maximum transfer rate $R_o$ multiplied by a rate of increase $R_i$, as shown in the following Formula 1. In this case, the $R_i$ is a smaller value of the $N_T$ and the $N_R$.

$$R_i = \min(N_T, N_R) \qquad \text{[Formula 1]}$$

For instance, MIMO communication system using 4 transmitting antennas and 4 receiving antennas may be able to theoretically obtain the transfer rate of 4 times of a single antenna system. After the theoretical capacity increase of the multi-antenna system is proved in the mid-90s, various technologies for practically enhancing a data transmission rate have been actively studied up to date and several technologies among them are already reflected in such a various wireless communication standard as a $3^{rd}$ generation mobile communication, a next generation wireless LAN and the like.

If we look at the research trend related to the multi-antenna until now, many active researches have been performed for such a study of various points of view as a study on information theory related to a multi-antenna communication capacity calculation in various channel environments and multiple access environment, a study on a radio channel measurement and model deduction of the multi-antenna system, a study on a space-time signal processing technology for enhancing a transmission reliability and a transmission rate, and the like.

Figure 7:
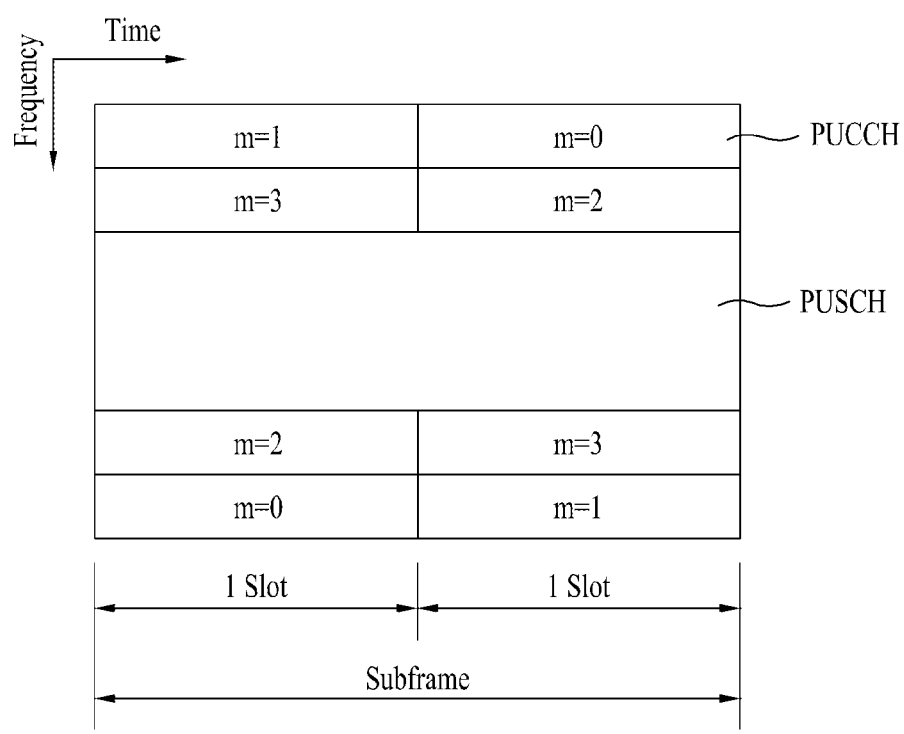
FIG. 7 is a diagram for a structure of an uplink radio frame in LTE system.

In case of mathematically modeling a communication method of the multi-antenna system in order to explain it with more specific way, it can be represented as follows. As shown in FIG. 7, assume that there exist $N_T$ number of transmitting antenna and $N_R$ number of receiving antenna. First of all, if we look into a transmission signal, since the maximum number of information capable of being transmitted is $N_T$ in case that there exists $N_T$ number of transmitting antenna, transmission information can be represented as a vector in the following Formula 2.

$$s = [s_1, s_2, \ldots, s_{N_T}]^T \qquad \text{[Formula 2]}$$

Meanwhile, for each of the transmission informations $s_1, s_2, \ldots, s_{N_T}$, a transmit power may be differentiated according to the each of the transmission informations. In this case, if each of the transmit powers is represented as $P_1, P_2, \ldots, P_{N_T}$, transmit power-adjusted transmission information can be represented as a vector in the following Formula 3.

$$\hat{s} = [\hat{s}_1, \hat{s}_2, \ldots, \hat{s}_{N_T}]^T = [P_1 s_1, P_1 s_1, \ldots, P_{N_T} s_{N_T}]^T \qquad \text{[Formula 3]}$$

And, if $\hat{s}$ is represented using a diagonal matrix P, it can be represented as a following Formula 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Formula 4]}$$

Meanwhile, let's consider a case that the $N_T$ number of transmission signal $x_1, x_2, \ldots, x_{N_T}$, which is practically transmitted, is configured in a manner of applying a weighted matrix W to the adjusted information vector $\hat{s}$. In this case, the weighted matrix performs a role of distributing the transmission information to each of the antennas according to the situation of the transmission channel and the like. The transmission signal $x_1, x_2, \ldots, x_{N_T}$, can be represented using a vector X in the following Formula 5. In this case, $W_{ij}$ means a weighting between an $i^{th}$ transmitting antenna and $j^{th}$ information. The W is called the weighted matrix or a precoding matrix.

$$X = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \vdots \\ w_{i1} & w_{i2} & \ldots & w_{iN_T} \\ \vdots & & \ddots & \vdots \\ w_{N_T 1} & w_{N_T 2} & \ldots & w_{N_t N_t} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Formula 5]}$$

In general, a physical meaning of a rank of a channel matrix may indicate a maximum number capable of transmitting different information from each other in a given channel. Hence, since the rank of the channel matrix is defined by a minimum number of the numbers of row or column independent from each other, the rank of the matrix is configured not to be greater than the number of the row or the column. For instance, the rank of a channel matrix H (rank (H)) is limited as shown in Formula 6.

$$\text{rank}(H) \leq \min(N_T, N_R) \qquad \text{[Formula 6]}$$

And, let's define each of the informations different from each other, which are transmitted using a multi-antenna technology, as a transport stream or simply a stream. The stream can be named a layer. Then, the number of the transport stream is naturally configured not to be greater than the rank of the channel, which is a maximum number capable of transmitting informations different from each other. Hence, the channel matrix H can be represented as Formula 7 in the following.

$$\text{\# of streams} \leq \text{rank}(H) \leq \min(N_T, N_R) \qquad \text{[Formula 7]}$$

In this case, '# of streams' indicates the number of streams. Meanwhile, in this case, it should be cautious that one stream can be transmitted via more than one antenna.

Various methods making one or more streams correspond to many antennas may exist. These methods can be described in accordance with the kind of the multi-antenna technology in the following description. A case of transmitting one stream via many antennas may be called a space diversity scheme and a case of transmitting many streams via many antennas may be called a space multiplexing scheme. Naturally, a hybrid form of the space diversity and the space multiplexing is also available.

Figure 5:
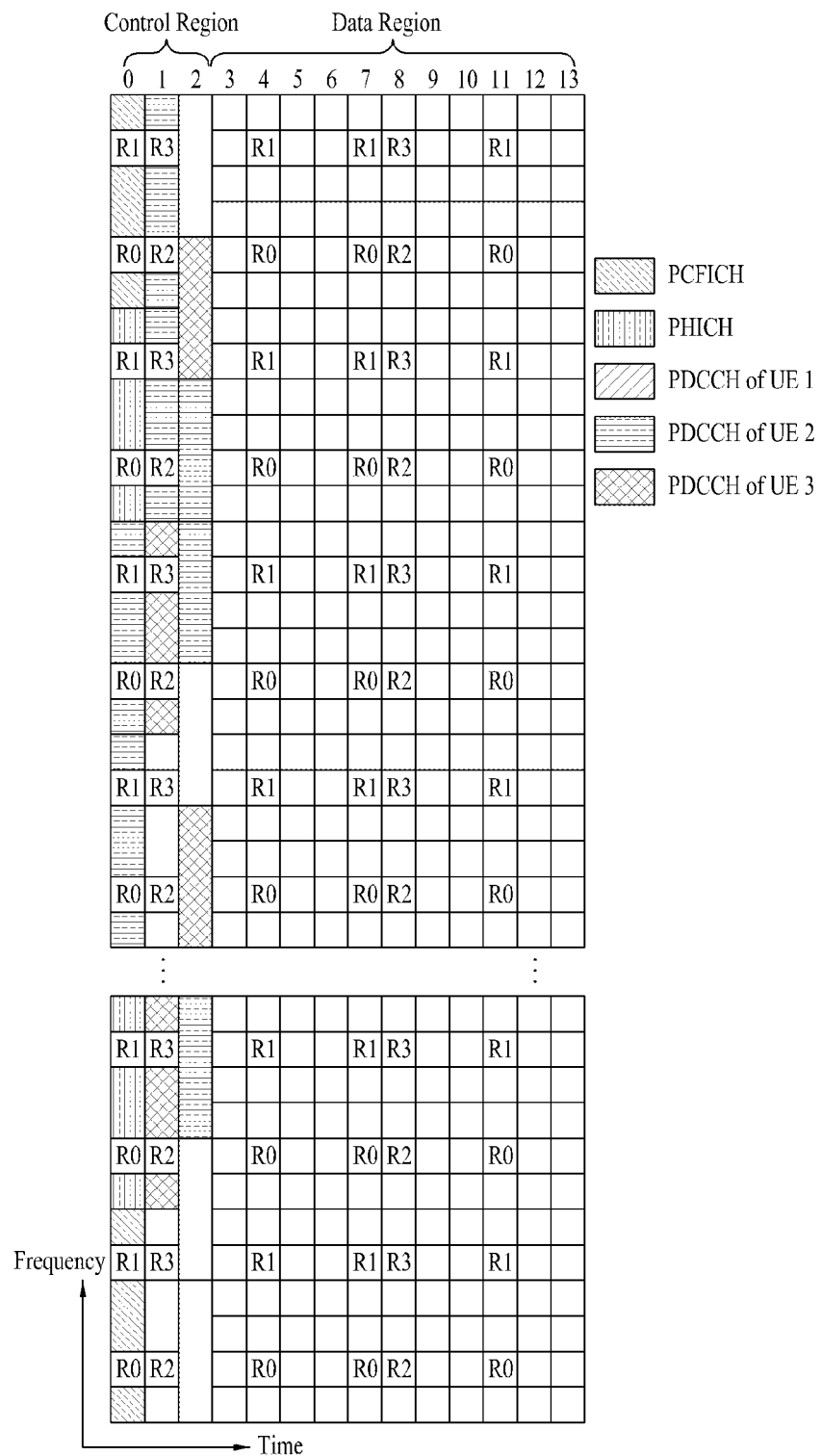
FIG. 5 is a diagram for a structure of a downlink radio frame in LTE system.

FIG. 5 is a diagram for showing an example of a control channel included in a control region of a single subframe in a DL radio frame.

Referring to FIG. 5, a subframe consists of 14 OFDM symbols. According to a subframe configuration, the first 1 to 3 OFDM symbols are used for a control region and the other 13~11 OFDM symbols are used for a data region. In the diagram, R1 to R4 may indicate a reference signal (hereinafter abbreviated RS) or a pilot signal for an antenna 0 to 3. The RS is fixed as a constant pattern in the subframe irrespective of the control region and the data region. The control channel is assigned to a resource to which the RS is not assigned in the control region and a traffic channel is also assigned to a resource to which the RS is not assigned in the data region. The control channel assigned to the control region may include a physical control format indicator channel (PCFICH), a physical hybrid-ARQ indicator channel (PHICH), a physical downlink control channel (PDCCH), and the like.

The PCFICH (physical control format indicator channel) informs a user equipment of the number of OFDM symbols used for the PDCCH on every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated into a QPSK (quadrature phase shift keying).

The PHICH (physical HARQ (hybrid-automatic repeat and request) indicator channel) is used for carrying HARQ ACK/NACK for an UL transmission. In particular, the PHICH indicates a channel to which DL ACK/NACK information is transmitted for UL HARQ. The PHICH consists of a single REG and is scrambled cell-specifically. The ACK/NACK is indicated by 1 bit and modulated into BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The PDCCH (physical DL control channel) is assigned to the first n OFDM symbol of a subframe. In this case, the n is an integer more than 1 and indicated by the PCFICH. The PDCCH consists of at least one CCE. The PDCCH informs each of user equipments or a user equipment group of an information on a resource assignment of PCH (paging channel) and DL-SCH (downlink-shared channel), which are transmission channels, an uplink scheduling grant, HARQ information and the like. The PCH (paging channel) and the DL-SCH (downlink-shared channel) are transmitted on the PDSCH. Hence, an eNode B and the user equipment transmit and receive data via the PDSCH in general except a specific control information or a specific service data.

Information on a user equipment (one or a plurality of user equipments) receiving data of PDSCH, a method of receiving and decoding the PDSCH data performed by the user equipment, and the like is transmitted in a manner of being included in the PDCCH. For instance, assume that a specific PDCCH is CRC masked with an RNTI (radio network temporary identity) called "A" and an information on data transmitted using a radio resource (e.g., frequency position) called "B" and a DCI format i.e., a transmission form information (e.g., a transport block size, a modulation scheme, coding information, and the like) called "C" is transmitted via a specific subframe. In this case, the user equipment in a cell monitors the PDCCH using the RNTI information of its own, if there exist at least one or more user equipments having the "A" RNTI, the user equipments receive the PDCCH and the PDSCH, which is indicated by the "B" and the "C", via the received information on the PDCCH.

FIG. 6 is a diagram of a resource unit used for constructing a downlink control channel in LTE system. In particular, FIG. 6 (a) indicates a case that the number of transmitting antennas of an eNode B corresponds to 1 or 2 and FIG. 6 (b) indicates a case that the number of transmitting antennas of the eNode B corresponds to 4. A reference signal (RS) pattern varies according to the number of transmitting antennas but a method of configuring a resource unit in relation to a control channel is identical irrespective of the number of transmitting antennas.

Referring to FIG. 6, a base resource unit of a downlink control channel is a REG The REG consists of 4 neighboring resource elements except an RS. The REG is represented in the drawing with a bold line. The PCFICH and the PHICH include 4 REGs and 3 REGs, respectively. The PDCCH consists of a CCE (control channel element) unit and one CCE includes 9 REGs.

In order for a UE to check whether the PDCCH consisting of L number of CCEs is transmitted to the UE, the UE is configured to check the CCEs arranged by a specific rule. A value of the L, which should be considered for the UE to receive the PDCCH, may become a plural number. The UE should check CCE aggregations to receive the PDCCH. The CCE aggregations are called a search space.

The search space can be classified into a UE-specific search space accessible by a specific UE only and a common search space accessible by all UEs in a cell. A UE monitors the common search space of which the CCE aggregation level corresponds to 4 and 8 and monitors the UE-specific search space of which the CCE aggregation level corresponds to 1, 2, 4, and 8. The common search space and the UE-specific search space may overlap with each other.

And, a position of a first (having a smallest index) CCE in a PDCCH search space, which is given to a random UE for each CCE aggregation level value, varies in every subframe depending on a user equipment. This is called a PDCCH search space hashing.

The CCE can be distributed to a system band. More specifically, a plurality of CCEs, which are logically contiguous, can be inputted to an interleaver. The interleaver performs a function of mixing a plurality of the CCEs with each other in REG unit. Hence, frequency/time resources forming a CCE are physically distributed in the total frequency/time domain within a control region of a subframe. Consequently, although a control channel is constructed in a CCE unit, the interleaving is performed in an REG unit. Hence, frequency diversity and interference randomization gain can be maximized.

FIG. 7 is a diagram for a structure of an uplink subframe used in LTE system.

Referring to FIG. 7, an UL subframe can be divided into a region to which a physical uplink control channel (PUCCH) carrying control information is assigned and a region to which a physical uplink shared channel (PUSCH) carrying a user data is assigned. A middle part of the subframe is assigned to the PUSCH and both sides of a data region are assigned to the PUCCH in a frequency domain. The control information transmitted on the PUCCH includes an ACK/NACK used for HARQ, a CQI (channel quality indicator) indicating a DL channel status, an RI (rank indicator) for MIMO, an SR (scheduling request) corresponding to an UL resource allocation request, and the like. The PUCCH for a single UE uses one resource block, which occupies a frequency different from each other in each slot within a subframe. In particular, 2 resource blocks assigned to the PUCCH are frequency hopped on a slot boundary. In particular, FIG. 7 shows an example that the PUCCHs satisfying conditions (e.g., m=0, 1, 2, 3) are assigned to a subframe.

As various devices requiring M2M (machine-to-machine) communication and high data transmission capacity are emerged and disseminated, data requisites for a cellular network are rapidly increasing in a current wireless communication environment. In order to satisfy high data requisite, communication technologies are developing to a carrier aggregation technology for efficiently using more frequency bands, a multi-antenna technology used for increasing data capacity in a limited frequency, a multi-base station cooperation technology, and the like and the communication environment is evolving in a manner that density of an accessible node is growing in the vicinity of a user. A system equipped with the node of high density may have higher system performance by means of cooperation between nodes. Compared to a node operating as an independent base station (a base station (BS), an advanced BS (ABS), a Node-B (NB), an eNode-B (eNB), an access point (AP), and the like) without cooperation, the aforementioned scheme may have superior performance.

Figure 8:
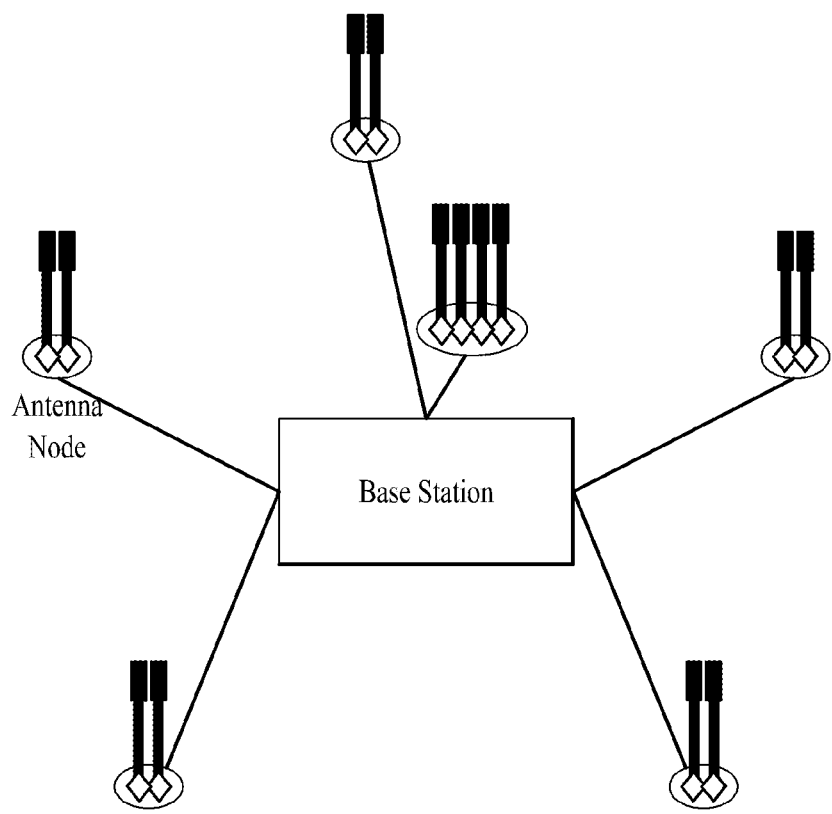
FIG. 8 is a diagram for an example of a multi node system in a next generation communication system.

FIG. 8 is a diagram for an example of a multi node system in a next generation communication system.

Referring to FIG. 8, if an individual node operates as a part of antenna group of a cell in a manner that a controller manages transmission and reception of all nodes, it may correspond to a distributed multi node system (DMNS) that forms a single cell. In this case, each of the individual nodes may receive a separate node ID or may operate as a part of antenna within the cell without a separate Node ID. Yet, if nodes have a cell identifier (ID) different from each other, it may correspond to a multi-cell system. If a multi cell is configured by a duplicated form according to coverage, this is called a multi-tier network.

Meanwhile, a Node-B, an eNode-B, a PeNB, a HeNB, an RRH (remote radio head), a relay, a distributed antenna, and the like may become a node and at least one antenna is installed in a node. A node is also called a transmission point. In general, a node indicates an antenna group apart from each other more than a prescribed space, the present invention defines and applies a node as a random antenna group irrespective of a space.

With the help of the introduction of the aforementioned multi-node system and a relay node, application of various communication schemes is enabled and channel quality enhancement can be performed. Yet, in order to apply the aforementioned MIMO scheme and inter-cell cooperation communication scheme to a multi-node environment, an introduction of a new control channel is required. To this end, a control channel considered as the newly introduced control channel, which corresponds to an E-PDCCH (enhanced-PDCCH), is under discussion. This channel is determined to be assigned to a data region (hereinafter described as PDSCH region) instead of a legacy control region (hereinafter described as PDCCH region). Consequently, control information on a node can be transmitted according to each UE via the E-PDCCH. Hence, a problem of shortage of the legacy PDCCH region can be solved as well. For reference, the E-PDCCH is not provided to a legacy UE. Instead, an LTE-A UE can receive the E-PDCCH only.

Figure 9:
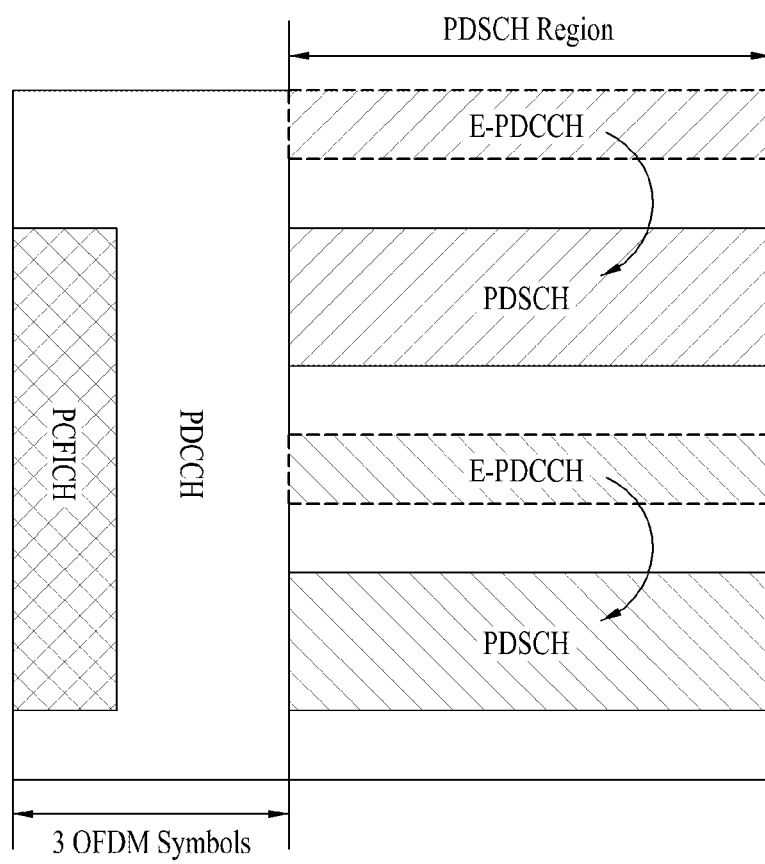
FIG. 9 is a diagram for an example of E-PDCCH and PDSCH scheduled by the E-PDCCH.

FIG. 9 is a diagram for an example of E-PDCCH and PDSCH scheduled by E-PDCCH.

Referring to FIG. 9, E-PDCCH can be used in a manner of defining a part of PDSCH region, which is generally transmitting data. A UE should perform a blind decoding process to detect presence or non-presence of the E-PDCCH in the UE. The E-PDCCH performs a scheduling operation (i.e., PDSCH, PUSCH control) identical to that of a legacy PDCCH. Yet, if the number of such a UE accessed a node as an RRH increases, more E-PDCCHs are assigned to the PDSCH region. Hence, the number of blind decoding, which should be performed by the UE, increases and complexity may increase as well.

Figure 10:
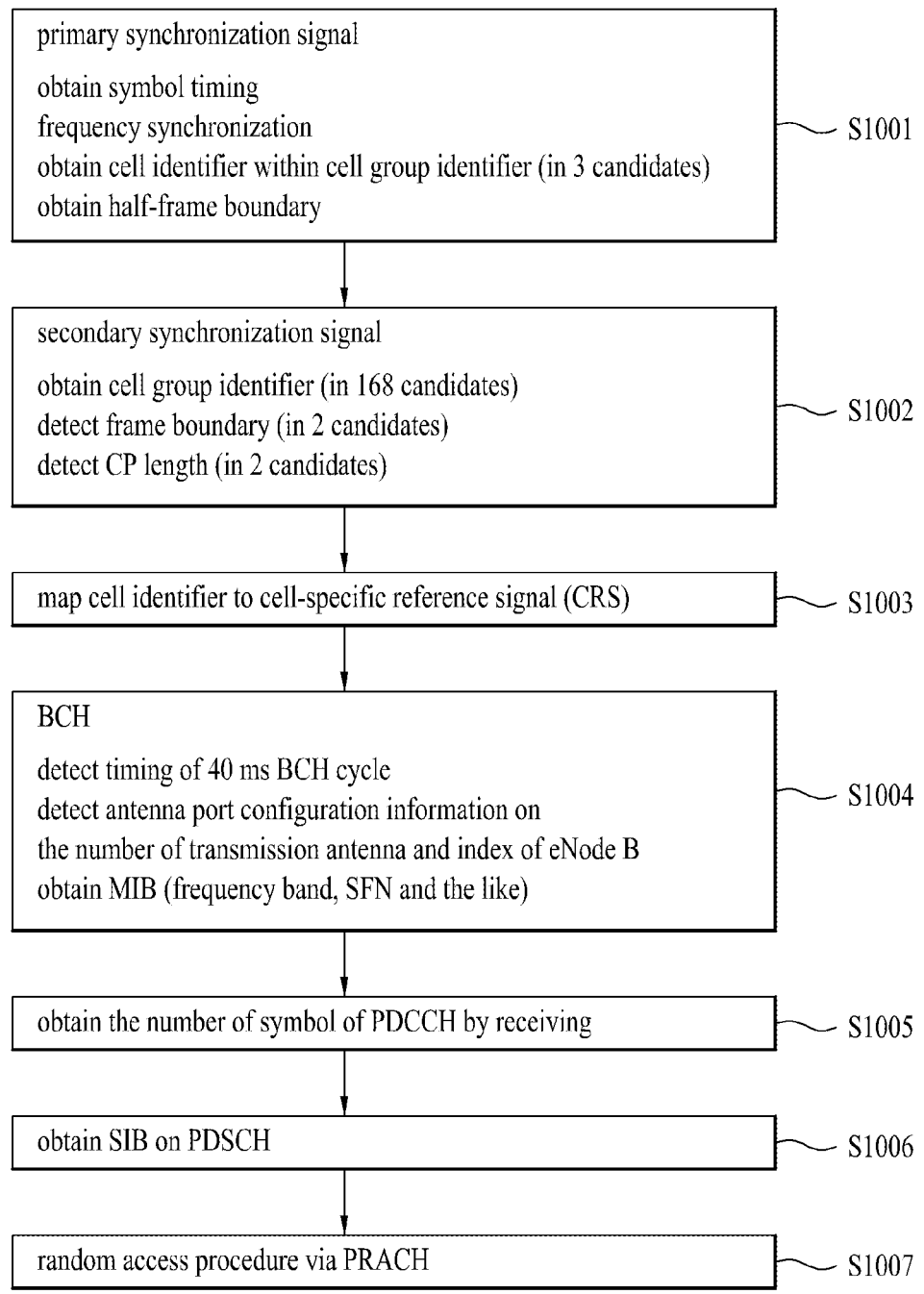
FIG. 10 is a flowchart for explaining operations from a synchronization process until an initial access process between a user equipment and an eNode B in LTE system.

FIG. 10 is a flowchart for explaining operations from a synchronization process until an initial access process between a user equipment and an eNode B in LTE system.

Referring to FIG. 10, in the step S1001, a UE preferentially receives a primary synchronization signal (SS). In this case, the UE performs symbol timing acquisition, half-frame boundary acquisition and frequency synchronization using the primary SS and obtains a cell identifier within a cell group identifier.

Subsequently, in the step S1002, the UE receives a secondary synchronization signal (SS). The UE performs cell group identifier acquisition, frame boundary detection, CP length detection and the like using the secondary SS. And, in the step S1003, the UE maps the obtained cell identifier to a cell-specific reference signal (CRS) to receive the CRS.

And, in the step S1004, the UE receives BCH, which is a logical channel. The BCH is received on PBCH based on the CRS. In this case, the UE detects antenna port configuration information on the number of transmitting antenna and index of an eNode B and obtains MIB (master information block). The MIB may include information on a frequency band, an SFN (system frame number) and the like.

Subsequently, in the step S1005, the UE obtains the number of symbols of PDCCH in a manner of receiving PCFICH and receives PDSCH based on the number of symbols of the PDCCH. In particular, in the step S1006, the UE obtains an SIB from the PDSCH. Lastly, in the step S1007, the UE performs a random access procedure via PRACH.

Meanwhile, in order for the UE to transmit and receive data, such a basic parameter as antenna port configuration (the number of antenna ports and index information), a transmission mode and the like should be defined. As mentioned in the foregoing description, such information as the basic parameter is received on PBCH.

The PBCH is a channel used by all users to commonly detect the channel. The PBCH is defined to be operated based on a CRS. One, two or four antenna ports can be assigned to transmit the PBCH. An MIB, which is practically transmitted on the PBCH, considers a reference signal for maximum four antenna ports and is mapped to a region except the reference signal.

Conventionally, the number of antenna ports is defined in a manner of scrambling a CRC part obtained via an MIB with one selected from predetermined CRC masks. The number of antenna port is identically applied not only PDCCH but also PDSCH. In case of a legacy PBCH, as shown in Table 1, if there exist two or more antenna ports, a transmit diversity scheme is applied. This is identically applied to PDCCH as well.

TABLE 1

| Name | Value | Semantics description |
| --- | --- | --- |
| AntennaInfoDedicated >transmissionMode | tm1, tm2 | If the number of PBCH antenna ports is one, tm1 is used as default; otherwise tm2 is used as default (tm1: single transmission, tm2: transmission diversity) |

Yet, UEs supporting E-PDCCH only can use an antenna configuration and a transmission scheme different from an antenna configuration and a transmission scheme used by UEs supporting a legacy PDCCH. The UEs supporting E-PDCCH only may be not able to determine a necessary antenna configuration and a transmission scheme by a legacy PBCH only. Basically, in case of using two or more antennas, the legacy PBCH and PDCCH are transmitted by a SFBC-based transmit diversity scheme (in case of 4 Tx, SFBC+FSTD).

Meanwhile, since E-PDCCH is defined to use a DM-RS, which is a UE-specific reference signal, an antenna port can be assigned in a manner of being different from a case of using a legacy CRS. And, it is necessary to consider an additional transmission scheme according to various antenna port configurations. For instance, since the SFBC-based transmit diversity scheme and a precoder cycling-based RE level random beamforming scheme can be supported in a manner of being appropriately distinguished from each other according to circumstance, in case of transmitting by transmit diversity, two or more transmission modes can be defined.

Hence, the PBCH should separately indicate information corresponding to an added transmission mode of E-PDCCH. When a transmission mode of the PBCH and the transmission mode of E-PDCCH are different from each other, the number of antenna port being used may vary. Hence, the number of antenna port of E-PDCCH should be additionally designated if necessary. The above-mentioned information can be explicitly signaled by a separate message or may be implicitly designated and blind decoded to reduce signaling overhead. Each of the methods is explained in the following.

First Embodiment

First of all, the present invention proposes an explicit signaling scheme using a spare bit, which is not used by an MIB of PBCH. This scheme is suitable for a case that all E-PDCCH channels use a designated transmission scheme and a designated antenna port configuration. As shown in Table 2, the PBCH includes information of 24 bits corresponding to the MIB. Among the 24 bits, the explicit signaling scheme uses a part of remaining spare bits of 10-bit long except 14 bits corresponding to 'dl-Bandwidth', 'phich-Config' and 'systemFrameNumber'.

TABLE 2

```
-- ASN1START
MasterInformationBlock ::=  SEQUENCE {
    dl-Bandwidth            ENUMERATED {
                                n6, n15, n25, n50, n75, n100},
    phich-Config            PHICH-Config,
    systemFrameNumber       BIT STRING (SIZE (8)),
    spare                   BIT STRING (SIZE (10)}
}
-- ASN1STOP
```

FIG. 11 is a diagram for an example of adding a parameter for E-PDCCH to MIB according to first embodiment of the present invention. In particular, FIG. 11 (a) shows a legacy MIB and FIG. 11 (b) to (d) show an MIB proposes by the present invention.

Referring to FIG. 11, a transmission mode to be applied to E-PDCCH as a basic parameter and fields related to an antenna port configuration which is to be used for the transmission mode can be added to a spare field. If the transmission mode and the antenna port configuration have a configuration identical to a configuration used on PBCH, it is not necessary to put additional information in the spare field or modify the MIB. For clarity, as depicted in FIG. 11 (a), assume that all spare bits are filled with 0.

In some cases, a part of ePDCCH channels may use a transmission scheme and an antenna port configuration different from a transmission scheme and an antenna port configuration specified in the MIB. In this case, demodulation may fail. Information of a spare field is regarded as invalid and the field can be detected by such a scheme as a blind decoding and the like. Meanwhile, as depicted in FIG. 11 (b), in case of performing blind decoding on all e-PD-CCH channels, a part (e.g., E-PDCCH transmission mode field) of spare bits is filled with 1. Except the aforementioned case, an example of a method of using spare bits by adding several fields can be considered as follows.

1) When it is able to differently designate a transmission mode of PBCH and a transmission mode of E-PDCCH, as depicted in FIG. 11 (b), the transmission mode of E-PDCCH is designated by first m number of bits of spare bits by MIB. For instance, when the transmission mode of E-PDCCH is assigned by 2 bits, if a value of the mode corresponds to 00, the transmission mode of the PBCH and the transmission mode of E-PDCCH become identical to each other. If the value of the mode corresponds to 01, it may operate in an added transmission mode 1 (e.g., precoder cycling). If the value of the mode corresponds to 10, it may operate in an added transmission mode 2 (e.g., SU-MIMO).

2) When it is able to differently designate the number of antenna as well as the transmission mode of the PBCH and the transmission mode of E-PDCCH, as depicted in FIG. 11 (c), the PBCH can map the transmission mode of E-PDCCH and the number of antenna port of E-PDCCH to m bit information and n bit information, respectively. For instance, if the maximum number of antenna ports to transmit E-PDCCH corresponds to 4, n is determined by 2 as depicted in Table 3. Table 3 shows an example for a method of designating the number of antenna ports of E-PDCCH using spare bits of the MIB.

TABLE 3

| Field | Length | Value | Mode |
|---|---|---|---|
| Number of transmission antenna port | 2 bit | 00 | 1 Tx |
| | | 01 | 2 Tx |
| | | 10 | 4 Tx |

3) The above-mentioned options assume a case that an index of an antenna port is fixed. In particular, when the number of antenna port varies 1 to 4, it is assumed that an antenna port index is fixed according to each of the number of antenna port. Since there exist pros and cons between a method of using the fixed number of antenna port and a method of variably assigning the number of antenna port, it is necessary to consider both methods. Hence, a field of spare bit related to an antenna port can indicate not only the number of antenna port but also an antenna port index. In particular, as depicted in FIG. 11 (d), k bits are assigned to an antenna port status field to indicate an active status of maximum k number of antenna ports (antenna port index: p~p+k−1). If a corresponding antenna port is used, the antenna port status field is mapped to 1.

In case of considering the aforementioned 1) to 3) examples, a legacy MIB and MIBs to which new fields are added can be configured as depicted in FIG. 11 b) to d). Instead of checking such information necessary for an initial access as SIB as well as such basic information as the transmission mode and the antenna port of E-PDCCH via a separate RRC signaling and the like, if the information necessary for an initial access can be indicated by the PBCH, additional signaling overhead and signaling latency can be reduced.

In particular, since E-PDCCH used for scheduling SIB is assigned to a common search space (CSS), it may consider a method of detecting information on the CSS via PBCH. In order to search for the CSS, a start symbol index where allocation to time axis is started and an RB offset index (or logical RB offset index) on frequency are obtained via the PBCH to identify a position of a resource. The CSS can be precisely detected only when an initial value of a scramble process used for generating a reference signal as well as an antenna port index of E-PDCCH corresponding to the CSS are known.

Besides, information used for eliminating inter-cell interference (eICIC) of E-PDCCH can also be delivered to PBCH by an eNB. Although the information can be delivered by utilizing the remaining spare bit, spare bit of 10 bits may be not sufficient to put all information. Hence, in order to additionally put information, it may consider a method of extending a resource size of a legacy PBCH.

Figure 12:
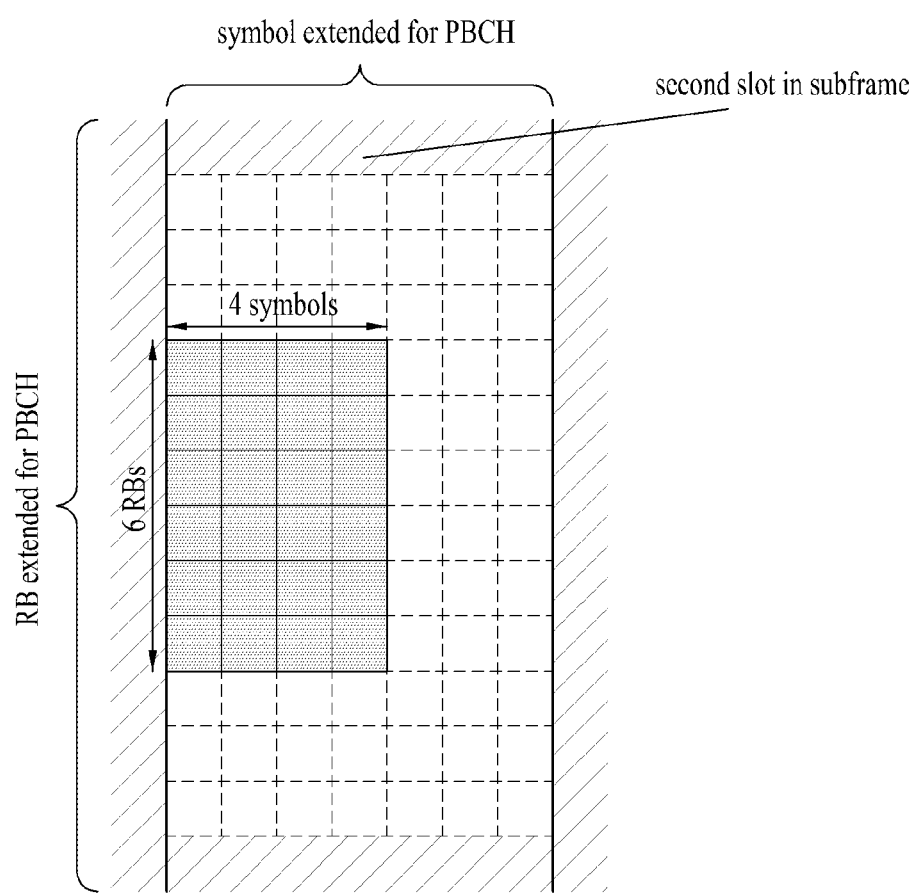
FIG. 12 is a diagram for an example of extending a resource for PBCH to transmit additional information according to first embodiment of the present invention.

FIG. 12 is a diagram for an example of extending a resource for PBCH to transmit additional information according to first embodiment of the present invention.

Referring to FIG. 12, a legacy PBCH has a bandwidth corresponding to 6 RBs on a single radio frame and occupies first to fourth symbol of a second slot in a given subframe. Hence, as depicted in FIG. 12, if the legacy PBCH is extended to maximum 7 symbols (length of one slot) or the bandwidth is extended (e.g., 12 RBs), it may transmit more E-PDCCH information.

Second Embodiment

Secondly, the present invention proposes a method of utilizing an implicit signaling scheme such as utilizing a legacy CRC masking.

As shown in Table 4, an MIB of a legacy PBCH uses a scheme of scrambling a CRC part of the MIB using a CRC mask according to the number of antenna port.

TABLE 4

| Number of transmit antenna ports at eNodeB | PBCH CRC mask $<x_{ant,0}, x_{ant,1}, \ldots, x_{ant,15}>$ |
|---|---|
| 1 | <0, 0, 0, 0, 0, 0, 0, 0, 0, 0, 0, 0, 0, 0, 0, 0> |
| 2 | <1, 1, 1, 1, 1, 1, 1, 1, 1, 1, 1, 1, 1, 1, 1, 1> |
| 4 | <0, 1, 0, 1, 0, 1, 0, 1, 0, 1, 0, 1, 0, 1, 0, 1> |

The CRC mask is identically used during a PBCH cycle (40 ms). In order to represent more configurations, it may consider a method of differently using the CRC mask in every frame and a method of using an additional CRC mask.

a) Although PBCH is transmitted in a manner of being divided into 4 frames, if channel status is good, it is possible to decode by a single reception. In particular, decoding can be performed by receiving a first frame only. Hence, in order to maintain identical information in every frame, an identical CRC mask is basically used. Yet, in consideration of a case that two or more receptions may practically occur, CRC masks different from each other are applied to each frame and various transmission modes can be represented by a combination of the CRC masks different from each other.

Table 5 shows an example of identifying a transmission mode when a SFBC or a precoder cycling-based transmit diversity scheme is transmitted by maximum 4 antenna ports using a CRC of contiguous 2 frames.

TABLE 5

| Detected values for the number of Tx antenna ports from $1^{st}$ frame and $2^{nd}$ frame | Number of Tx antenna ports | Transmission mode |
|---|---|---|
| (1, 1) | 1 | Single Tx transmission |
| (2, 2) | 2 | SFBC |

TABLE 5-continued

| Detected values for the number of Tx antenna ports from $1^{st}$ frame and $2^{nd}$ frame | Number of Tx antenna ports | Transmission mode |
|---|---|---|
| (4, 4) | 4 | SFBC + FSTD |
| (1, 2) (or (2, 1)) | 2 | Precoder cycling |
| (1, 4) (or (4, 1)) | 4 | Precoder cycling |

Referring to Table 5, it is able to know that a transmission mode and the number of antenna are indicated according to a combination of CRC values detected in a first frame and a second frame. For instance, (1, 1) indicates a case that the CRC value detected in the first frame and the CRC value detected in the second frame correspond to 1 and 1, respectively. It indicates that the number of transmission antenna corresponds to 1 and the transmission mode corresponds to a single antenna transmission. On the contrary, (1, 2) indicates a case that the CRC value detected in the first frame and the CRC value detected in the second frame correspond to 1 and 2, respectively. It indicates that the number of transmission antenna corresponds to 2 and the transmission mode corresponds to a precoder cycling scheme.

Figure 13:
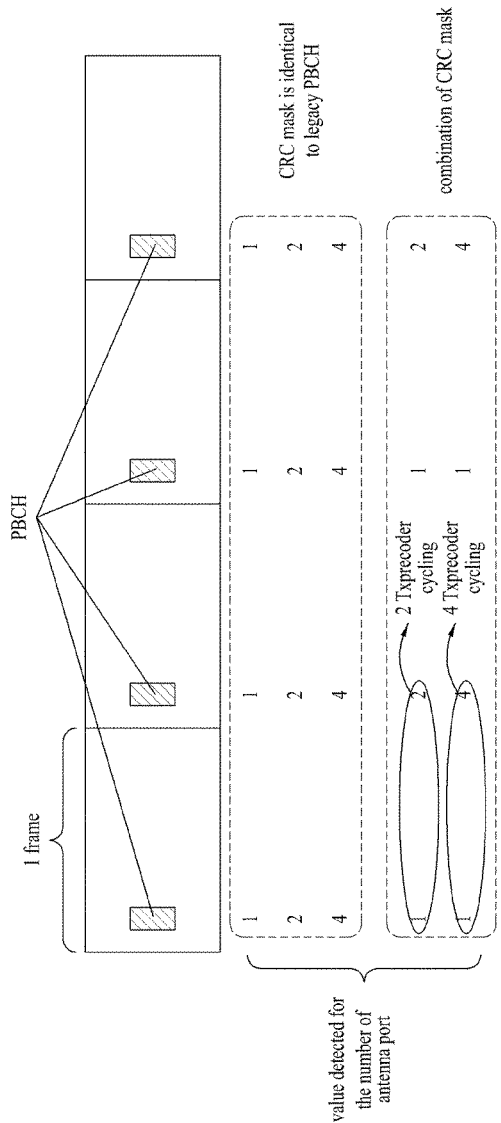
FIG. 13 is a diagram for an example of a scheme of determining a parameter of E-PDCCH using CRC values of contiguous frames according to a second embodiment of the present invention.

FIG. 13 is a diagram for an example of a scheme of determining a parameter of E-PDCCH using CRC values of contiguous frames according to a second embodiment of the present invention.

Referring to FIG. 13, it is able to know that CRC mask information of 3 or 4 contiguous frames can be combined with each other to map information on more transmission modes.

b) When it is considered that information necessary for detecting PDCCH can be checked by a single frame only using a legacy PBCH, using two or more frames may become a drawback. Hence, the number of antenna port and a transmission mode can be represented at once in a manner of extending types of a legacy CRC mask shown in Table 3.

Figure 14:
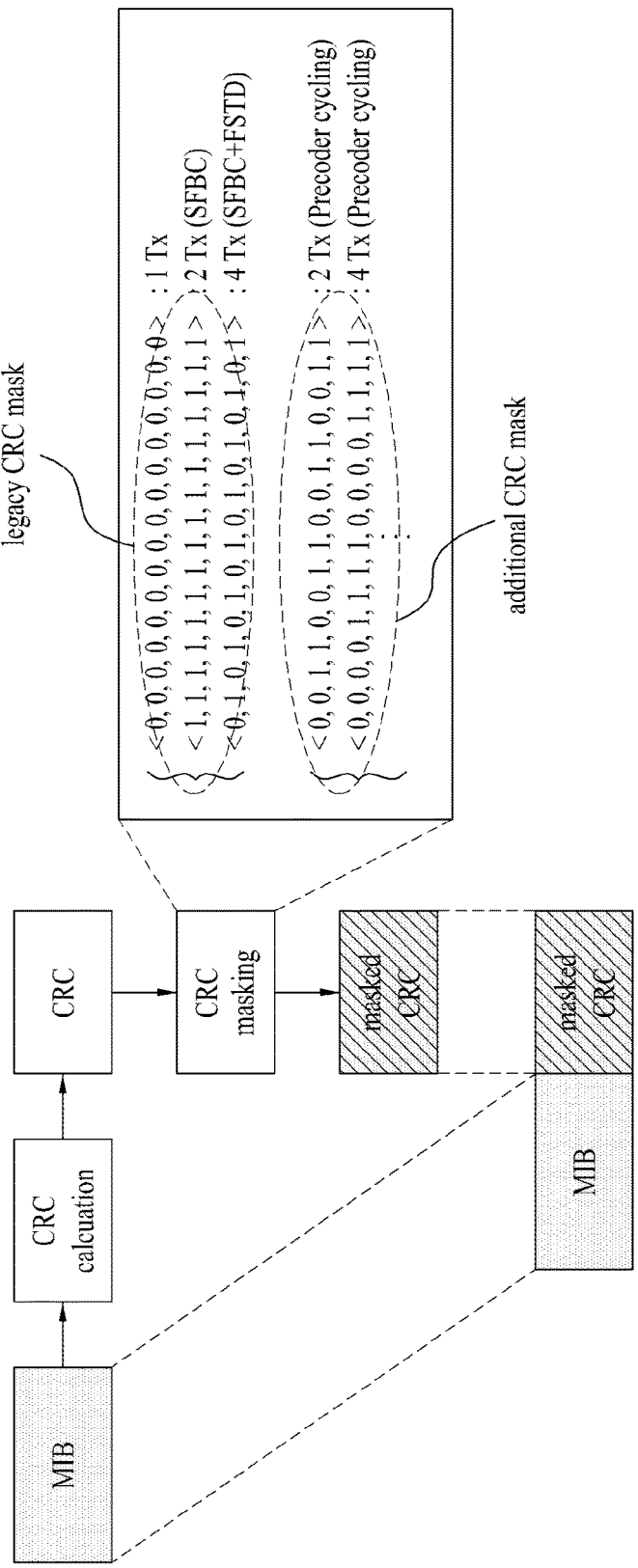
FIG. 14 is a diagram for an example of a method of representing a transmission mode as well as the number of antenna port using an additional CRC mask as well as a legacy CRC mask according to a second embodiment of the present invention.

FIG. 14 is a diagram for an example of a method of representing not only a transmission mode but also the number of antenna port using an additional CRC mask as well as a legacy CRC mask according to a second embodiment of the present invention.

Third Embodiment

As a third proposed method, it may consider a method capable of detecting an antenna port of E-PDCCH and a transmission mode in a state that legacy MIB information is not modified at all. When an additional signaling is not possible via a separate resource, a scheme of detecting an added mode via blind decoding can be applied although an amount of calculation is added more.

Conventionally, total 3 times of blind decoding are performed to find out a transmission mode of PDCCH and the number of antenna port and the amount of calculation to be added varies according to a transmission mode to be used and an antenna port configuration.

1) A blind decoding can be sequentially tried out according to an antenna port in accordance with each transmission mode. When maximum k number of antenna ports are used and an antenna port is used from 'p' to 'p+k−1', in case of a single antenna, indexes of {p}, {p+1}, {p+2}, . . . , {p+k−1} are sequentially demodulated. If demodulation is not successful, an antenna port set consisting of two antennas is sequentially demodulated. In particular, such a combination as {p, p+1}, {p, p+2}, . . . , {p, p+K−1}, {p+1, p+2}, . . . , {p+k−2, p+k−2} and the like are possible. When the number of transmission mode additionally used for E-PDCCH corresponds to $N_{TM}$ and the maximum number of available antenna port corresponds to k, the maximum number of additional blind decoding can be represented as Formula 8 as follows.

$$\text{Number of } BD = \sum_{i=1}^{N_{TM}} \sum_{j=1}^{N_{SET,i}} {}_kC_{N_{AntSet}(i,j)}$$ [Formula 8]

In this case, $N_{SET,i}$ corresponds to the number of antenna port sets used by a transmission mode in which $i^{th}$ blind decoding is performed among a plurality of available transmission modes (in case of using 1, 2 and 4 transmission antennas, $N_{SET,i}=3$). $N_{AntSet}(i, j)$ indicates the number of antennas used by $j^{th}$ antenna port set of an $i^{th}$ transmission mode. (in case of using 1, 2 and 4 transmission antennas in a first transmission mode, $N_{AntSet}(i, j)$ becomes 4.)

As an example, when two transmission modes are additionally used and the number of antennas capable of being used in each mode are identically correspond to 1, 2 and 4, if the example is reflected to Formula 8, it is able to know that maximum 22 times of blind decoding are added as depicted in Formula 9 as follows.

$$\text{Number of } BD =$$ [Formula 9]
$$\sum_{i=1}^{2} \sum_{j=1}^{3} {}_4C_{N_{AntSet}(i,j)} = 2 \cdot ({}_4C_1 + {}_4C_2 + {}_4C_4) = 22$$

Yet, although performing blind decoding for all available cases does not require an additional signaling, it may bring a burden of great amount of calculation in some cases.

In case of a legacy PDCCH, an antenna port used for a rank 1 transmission, which uses a single antenna port only, is defined via an RRC signaling. If this sort of information is used for a case of two or more ranks, the amount of calculating the blind decoding can be considerably reduced. In particular, an eNB signals information on one antenna port set among antenna port sets being used for the case of two or more ranks. By doing so, in case of a rank 1, it is not necessary to perform blind decoding to search for an antenna port. Moreover, since one antenna port index among two antenna ports is given, in case of a rank 2, the amount of calculation is reduced to a half. Consequently, 22 times of blind decoding are reduced to 6 times of blind decoding.

Of course, it may considerably reduce the amount of calculation when a single antenna port index is known via antenna port information. Yet, if a combination of antenna port sets is limited, the amount of calculation can be more reduced. In particular, since it is not necessary to transmit using all antenna port sets capable of being practically combined with each other, antenna port sets of a meaningful combination are determined in advance.

For instance, when antenna port 7~10 are used in a DM-RS mode, in case of using a single transmission antenna, a user may determine to use an antenna port 7 or 9 only in a manner of considering that it is not necessary to use all antennas of the antenna port 7~10. In case of using two transmission antennas, it may consider two schemes including a scheme of assigning RSs occupying an identical RE with CDM and a scheme of assigning RS resources occupying REs different from each other to be orthogonal to each other.

As a representative example for the aforementioned two cases, an antenna port set {7, 8} and an antenna port set {7, 9} can be defined, respectively. In this case, if an antenna port index of the aforementioned rank 1 transmission is utilized in a manner of being signaled, the amount of the calculation can be more reduced. In particular, when two transmission antennas are used, if it is determined that an antenna port index of an antenna corresponds to 8, a set of {7, 8} including '8' can be selected from a plurality of candidate antenna sets.

Figure 15:
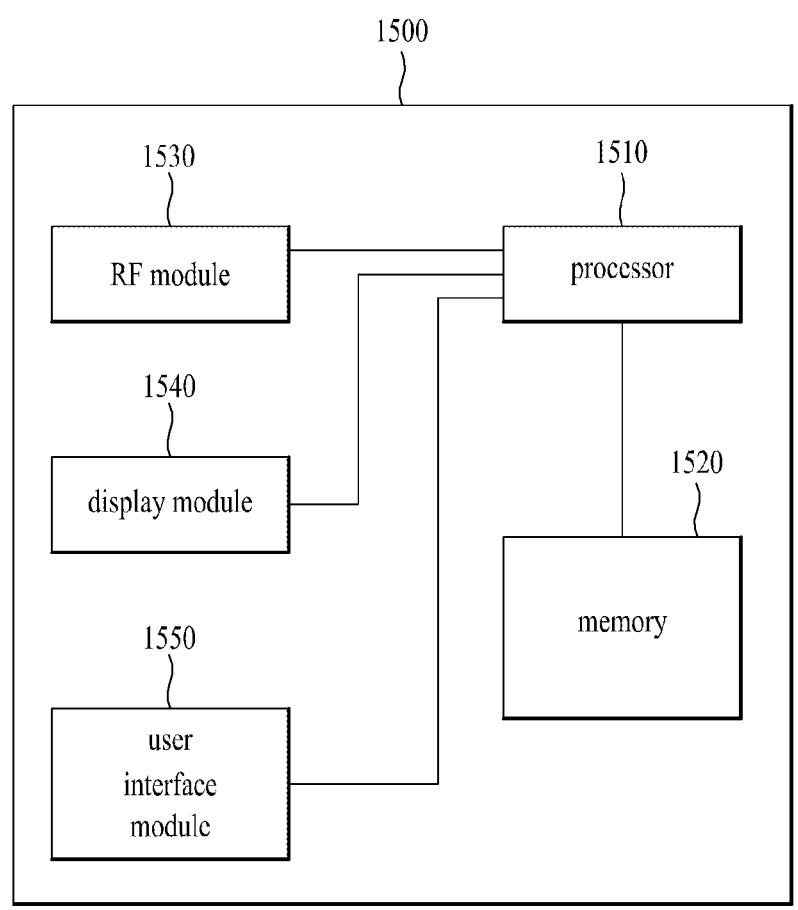
FIG. 15 is a block diagram for an example of a communication device according to one embodiment of the present invention.

FIG. 15 is a block diagram for an example of a communication device according to one embodiment of the present invention.

Referring to FIG. 15, a communication device 1500 may include a processor 1510, a memory 1520, an RF module 1530, a display module 1540, and a user interface module 1550.

Since the communication device 1500 is depicted for clarity of description, prescribed module(s) may be omitted in part. The communication device 1500 may further include necessary module(s). And, a prescribed module of the communication device 1500 may be divided into subdivided modules. A processor 1510 is configured to perform an operation according to the embodiments of the present invention illustrated with reference to drawings. In particular, the detailed operation of the processor 1510 may refer to the former contents described with reference to FIG. 1 to FIG. 14.

The memory 1520 is connected with the processor 1510 and stores an operating system, applications, program codes, data, and the like. The RF module 1530 is connected with the processor 1510 and then performs a function of converting a baseband signal to a radio signal or a function of converting a radio signal to a baseband signal. To this end, the RF module 1530 performs an analog conversion, amplification, a filtering, and a frequency up conversion, or performs processes inverse to the former processes. The display module 1540 is connected with the processor 1510 and displays various kinds of information. And, the display module 1540 can be implemented using such a well-known component as an LCD (liquid crystal display), an LED (light emitting diode), an OLED (organic light emitting diode) display and the like, by which the present invention may be non-limited. The user interface module 1550 is connected with the processor 1510 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method for a user equipment to receive a downlink control channel in a wireless communication system and an apparatus therefor are described with reference to examples applied to 3GPP LTE system, it may be applicable to various kinds of wireless communication systems as well as the 3GPP LTE system.

What is claimed is:

1. A method of receiving a control channel, which is received by a user equipment (UE) in a wireless communication system, the method comprising:
receiving a physical broadcast channel (PBCH) in 4 frames from an eNodeB;
determining a transmission mode and a number of antenna ports based on a combination of a first cyclic redundancy check (CRC) masked to the PBCH in a first frame among the 4 frames and a second CRC masked to the PBCH in a second frame among the 4 frames; and
receiving the control channel based on the determined transmission mode and the determined number of antenna ports.

2. The method according to claim 1, wherein the PBCH includes a master information block (MIB).

3. The method according to claim 2, wherein if the transmission mode of the PBCH and the transmission mode of the control channel are identical to each other, a remaining field of the MIB is set to 0.

4. The method according to claim 1, wherein the transmission mode corresponds to one selected from a group consisting of a single antenna transmission scheme, a space frequency block code (SFBC)-based transmit diversity scheme and a precoder cycling-based resource element (RE) level random beamforming scheme.

5. The method according to claim 1, wherein the number of antenna ports is 1, 2 or 4.

6. The method according to claim 1, wherein the PBCH is received based on a cell-specific reference signal, and
wherein the control channel is received based on a UE-specific reference signal.

7. A user equipment (UE) in a wireless communication system, the UE comprising:
a wireless communication module configured to receive a signal from an eNode B; and
a processor configured to:
control the wireless communication module to receive a physical broadcast channel (PBCH) in 4 frames from the eNode B,
determine a transmission mode and a number of antenna ports based on a combination of a first cyclic redundancy check (CRC) masked to the PBCH in a first frame among the 4 frames and a second CRC masked to the PBCH in a second frame among the 4 frames, and
control the wireless communication module to receive a control channel based on the determined transmission mode and the determined number of antenna ports.

8. The UE according to claim 7, wherein the PBCH includes a master information block (MIB).

9. The UE according to claim 8, wherein if the transmission mode of the PBCH and the transmission mode of the control channel are identical to each other, a remaining field of the MIB is set to 0.

10. The UE according to claim 7, wherein the transmission mode corresponds to one selected from a group consisting of a single antenna transmission scheme, a space frequency block code (SFBC)-based transmit diversity scheme and a precoder cycling-based resource element (RE) level random beamforming scheme.

11. The UE according to claim 7, wherein the number of antenna ports is 1, 2 or 4.

12. The UE according to claim 7, wherein the PBCH is received by the wireless communication module based on a cell-specific reference signal, and
wherein the control channel is received by the wireless communication module based on a UE-specific reference signal.

* * * * *